United States Patent [19]

Wu et al.

[11] Patent Number: 4,681,916
[45] Date of Patent: Jul. 21, 1987

[54] POLY (VINYL CHLORIDE) COMPOSITIONS

[75] Inventors: Muyen M. Wu, Hudson; George S. Li, Solon; Elmer J. Dewitt, Cuyahoga Falls, all of Ohio

[73] Assignee: The Standard Oil Company, Cleveland, Ohio

[21] Appl. No.: 859,517

[22] Filed: May 5, 1986

[51] Int. Cl.$^4$ .............................................. C08L 27/06
[52] U.S. Cl. .................................................. 525/210
[58] Field of Search .......................... 525/210; 526/280

[56] References Cited

U.S. PATENT DOCUMENTS

| | | | |
|---|---|---|---|
| 4,074,038 | 2/1978 | Li | 526/280 |
| 4,117,040 | 9/1978 | Li | 525/210 |
| 4,153,648 | 5/1979 | Li | 525/210 |

Primary Examiner—Paul R. Michl
Attorney, Agent, or Firm—Charles S. Lynch; John E. Miller; Larry W. Evans

[57] ABSTRACT

A composition comprising an intimate admixture of (a) 50 to 98 parts by weight of a vinyl chloride polymer having an inherent viscosity of at least 0.4, and (b) 50 to 2 parts by weight of an addition terpolymer containing acrylonitrile, indene and a third monomer selected from methyl methacrylate or at least one monomer of the group α-methylstryene and vinyl aromatics of the formula:

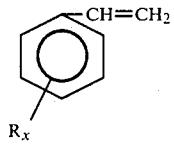

where each R is independently selected from Cl, H and a $C_1$ to $C_9$ alkyl group and x=1 or 2, combined in the polymer structure such that (1) when the third monomer is methyl methacrylate, the polymer contains in weight percent 2–35 acrylonitrile, 10–67 indene, 5–85 methyl methacrylate, and the moles of acrylonitrile plus methyl methacrylate are equal to or more than the moles of indene, (2) when the third monomer is one of both of α-methylstyrene and said vinyl aromatics, the polymer contains in weight percent 10–40 acrylonitrile, 5–67 indene and 4–70 of said third monomer, and the moles of acrylonitrile plus said vinyl aromatics is equal to or greater than the moles of α-methylstyrene plus indene.

16 Claims, No Drawings

POLY (VINYL CHLORIDE) COMPOSITIONS

This invention relates to poly(vinyl chloride) plastic molding compositions having improved working and performance characteristics, particularly a higher heat distortion temperature (HDT).

Poly(vinyl chloride) resins are well known to be useful to mold many end products such as bottles, film, sheet, pipe, structural moldings. However, the normal poly(vinyl chloride) resin compositions used to make rigid end products have too low a heat distortion temperature for use in applications under heat and load because the shape of the product will become distorted when approaching the heat distortion temperature. For instance, it would be desirable to have poly(vinyl chloride) compositions in the form of pipe and bottles that will stand a higher temperature in service than the standard poly(vinyl chloride) resins having a normal 65° to 70° or 71° C. heat distortion temperature.

It is an object of the present invention to provide rigid poly(vinyl chloride) compositions having improved properties, particularly a higher heat distortion temperature, as well as good flexural modulus and tensile strength, among other mechanical properties.

Other objects, as well as aspects, features and advantages of the present invention, will become apparent from a study of specification, including the examples and the claims.

The objects enumerated above, and other objects, are realized according to the present invention by providing a composition or blend of a vinyl chloride polymer and certain terpolymers containing indene as one of the monomers.

The vinyl chloride resin of the blend of the invention can be a homopolymer of vinyl chloride or a copolymer of vinyl chloride with a minor portion of one or more monomers copolymerizable with vinyl chloride. In such copolymers vinyl chloride comprises on a weight basis at least about 80 (preferably at least 90) percent of the copolymer and the copolymerizable monomer comprises up to about 20 (preferably up to about 10) percent. A wide variety of copolymerizable monomers may be used to prepare such vinyl chloride copolymers. These include vinylidene chloride; vinyl acetate and vinyl stearate; acrylic and methacrylic acid esters; olefins such as ethylene, propylene, isobutylene and the like; vinyl alkyl ethers such as vinyl isobutyl ether, vinyl lauryl ether, and vinyl cetyl ether; acrylic acid and methacrylic acid; acrylonitrile and methacrylonitrile; diethyl fumarate; maleic anhydride; dimethyl itaconate; styrene, N-vinyl carbazole; N-vinyl pyrrolidone; or mixtures thereof.

Methods for the preparation of vinyl chloride polymers are well known in the art and reported in the literature. See for example Kirk-Othmer, *Encyclopedia of Chemical Technology*, Third Edition, Interscience Publishers, Volume 23, pages 886-936, (Copyright 1983), the disclosures of which is incorporated herein by reference. Vinyl chloride polymers are available from a number of commercial suppliers. For preparing blends of this invention for use in injection molding operations, the vinyl chloride polymer usually has an inherent viscosity (as measured at a concentration of 0.5 gram per 100 grams of cyclohexanone at 25° C.) in the range of about 0.40 to about 0.70 and more usually in the range of about 0.50 to 0.70. Blends of such injection molding grade poly(vinyl chloride) homopolymer with our terpolymers are particularly useful. Blends of the terpolymers with extrusion grade vinyl chloride polymers are also very useful, and the extrusion grade vinyl chloride polymers used in such blends generally have viscosities in the inherent viscosity range from over 0.70 to 1.2, measured on the same basis. The present blends usually use a vinyl chloride polymer having an inherent viscosity of 0.54 to 1.

The terpolymers used in the blends of the present invention are polymers that are the result of addition polymerization of the monomers acrylonitrile and indene with a third monomer, which is methyl methacrylate, or is at least one monomer of the group α-methylstyrene and vinyl aromatics of the formula

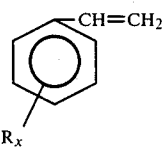

where each R is independently selected from Cl, H and a $C_1$ to $C_9$ alkyl group and $x = 1$ or 2. These terpolymers usually have a relatively low inherent viscosity. This low viscosity is itself an advantage in making blends.

As used herein inherent viscosity is in deciliters per gram of polymer composition.

According to the present invention there is provided a composition comprising an intimate admixture of (a) 50 to 98 parts by weight of a vinyl chloride polymer having an inherent viscosity of at least 0.4 and (b) 50 to 2 parts by weight of an addition terpolymer containing acrylonitrile, indene and a third monomer selected from methyl methacrylate or at least one monomer of the group α-methylstyrene and vinyl aromatics of the formula:

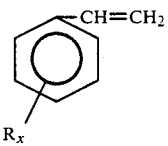

where each R is independently selected from Cl, H and a $C_1$ to $C_9$, usually $C_1$ to $C_2$, alkyl group, and $x = 1$ or 2, combined in the polymer structure such that (1) when the third monomer is methyl methacrylate, the polymer contains in weight percent 2-35 acrylonitrile, 10-67 indene, 5-85 methyl methacrylate, and the moles of acrylonitrile plus methyl methacrylate are equal to or more than the moles of indene, (2) when the third monomer is at least one of α-methylstyrene and said vinyl aromatics of the polymer contains in weight percent 10-40 acrylonitrile, 5-67 indene and 4-70 of said third monomer, and the moles of acrylonitrile plus said vinyl aromatics is equal to or greater than the moles of α-methylstyrene plus indene.

In our compositions, a particularly useful group of said vinyl aromatic monomers of the formula set forth above are styrene, o-chlorostyrene, p-chlorostyrene, o-ethylstyrene, p-ethylstyrene, o-tert.-butylstyrene, p-tert.-butylstyrene, o-methylstyrene, m-methylstyrene, p-methylstyrene, m-tert.-butylstyrene, m-ethylstyrene and o,p-dichlorostyrene.

In particular, styrene is an especially useful and often preferred vinyl aromatic monomer of said formula used to make polymers used in the vinyl chloride polymer blends of the invention. Thus, in the embodiment of the invention there is provided a composition comprising an intimate admixture of (a) 50 to 98 parts by weight of a vinyl chloride polymer having an inherent viscosity of at least 0.4 and (b) 50 to 2 parts by weight of an addition terpolymer containing acrylonitrile, indene and a third monomer selected from methyl methacrylate or one or both of styrene and α-methylstyrene, combined in the polymer structure such that, (1) when the third monomer is methyl methacrylate, the polymer contains in weight percent 2-35 acrylonitrile, 10-67 indene, 5-85 methyl methacrylate, and the moles of acrylonitrile plus methyl methacrylate are equal to or more than the moles of indene, (2) when the third monomer is one or both of α-methylstyrene and styrene, the polymer contains in weight percent 10-40 acrylonitrile, 5-67 indene, 4-70 of the third monomer α-methylstyrene and/or styrene, and the moles of acrylonitrile plus styrene are equal to or greater than the moles of α-methylstyrene plus indene.

In the foregoing compositions of this embodiment of the invention the usual composition ranges for particular terpolymers in weight percent are as follows:

1. for an acrylonitrile, methyl methacrylate, indene terpolymer:
Acrylonitrile: 2-35
Methyl methacrylate: 5-85
Indene: 10-67

2. for an acrylonitrile, α-methylstyrene, indene terpolymer:
Acrylonitrile: 31-40
α-Methylstyrene: 4-64
Indene: 5-65

3. for an acrylonitrile, styrene, indene terpolymer:
Acrylonitrile: 10-40
Styrene: 4-70
Indene: 10-67

In the terpolymer compositions forming the additive component of our invention, we have found that the indene and the α-methylstyrene and/or styrene are the main components increasing the HDT, while the polar compounds, acrylonitrile and methylacrylate, contribute to compatibility with the vinyl chloride polymer, thus helping to maintain other physical mechanical properties.

Polymers used in the compositions of the invention that contain at least 25 weight percent combined indene in their structure have the added advantage that they have a low inherent viscosity and their blends with vinyl chloride polymers have improved processability because of the resulting higher melt index.

Properties reported in this application were determined by the procedures of the following ASTM designations:
Heat Distortion Temperature: ASTM D 648 (264 psi. unannealed)
Tensile Strength: ASTM D 638 (Modified)
Flexural Strength: ASTM D 790
Flexural Modulus: ASTM D 790
Melt Index: ASTM D 1238

Also, when inherent viscosity was determined for the terpolymers, it was for a solution of 0.2 grams of the polymer in 100 cc of dimethylformamide and was measured at 25° C.

The compositions of this invention can include other ingredients, such as impact modifiers, thermal stabilizers, processing aids, fillers, lubricants, pigments, flame retardants, reinforcing fibers, smoke retardants, antioxidants and the like.

The compositions of this invention can also contain fillers. Examples are calcium carbonate, wollastonite, silicates such as talc, acicular calcium silicate, titanium dioxide, potassium titanate, and glass flakes. Amounts of such fillers are up to about 50 parts per 100 parts of the combined vinyl chloride polymer plus the terpolymer. The following examples of the compositions of the invention are merely illustrative and are not to be considered limiting.

In the examples unless otherwise stated, the PVC used in the blends was an injection grade PVC having an inherent viscosity of 0.68 deciliters/gm. for a 0.5 weight percent solution in cyclohexanone, and when stabilized with 3 parts by weight of Thermolite 813 per 100 parts of PVC, the PVC had a tensile strength of 8,500 psi, an HDT of 70° C., a flexural strength of 12,400 psi, a flexural modulus of 430,000 psi, a notched Izod of 0.26 ft-lbs/sq. in., and a melt index of 0.6 grams/10 minutes.

In the examples, Thermolite 813 is di-n-octyltin maleate polymer sold by M & T Chemicals Inc. having the formula

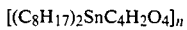

having a melting point of 90° C. and specific gravity of 0.6. It is a commonly used thermal stabilizer.

In the following examples 1-5 the poly(vinyl chloride) used was a commercial extrusion grade PVC having an inherent viscosity of 0.93 deciliters/gram for 0.2 weight percent solution to cyclohexanone measured at 25° C. When compounded with 3 parts of Thermolite 813 per 100 weight parts of PVC, the stabilized PVC had an HDT of 72° C., a tensile strength of 10,000 psi, a flexural strength of 13,700 psi and a flexural modulus of 460,000 psi. Its melt index was to low to measure.

EXAMPLE 1

A terpolymer was made by suspension polymerization according to the following recipe. Amounts are in weight parts per 100 parts of total monomers

| PHM | Components |
|---|---|
| 150 | H$_2$O |
| 0.6 | 2,2'-azobis(2,4-dimethylvaleronitrile) |
| 0.2 | hydroxylethylcellulose (suspending agent) |
| 26.5 | Acrylonitrile |
| 5 | Methyl Methacrylate |
| 68.5 | Indene |

150 parts by weight of distilled water, 0.2 parts of HEC (which had been dissolved in water), 0.2 parts of 2,2'-azobis(2,4-dimethylvaleronitrile), 26.5 of Acrylonitrile, and 68.5 parts of indene were charged into reactor provided with a stirrer. The reactor was purged with nitrogen, and was kept under nitrogen pressure, The temperature of the reactor was held for 5 minutes at 72° C. with stirring; then a monomer mixture comprising 0.4 parts of 2,2'-azobis(2,4-dimethylvaleronitrile) and 5 parts of methyl methacrylate was added continually into the reactor over a period of 7.0 hours through a syringe pump. The resulting mixture was further allowed to react for 2 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 28.6 percent yield. The composition of the polymer in wt. percent was 28 acrylonitrile, 6 methyl methacrylate and 66 indene as determined by $C^{13}$ NMR and nitrogen analysis.

25 parts by weight of the terpolymer was mixed with 75 parts of extrusion grade PVC and 3 parts Thermolite 813 as thermostabilizer. The mixture was kneaded for 5 minutes with a mixing brabender having a surface temperature of 190° C. The resulting blend was press formed at 190° C. into a sheet, then a plaque. The resin plaque thus prepared was tested for HDT which was 72.5° C.

EXAMPLE 2

A terpolymer was made by suspension polymerization according to the following recipe. Amounts are in weight parts per 100 parts of total monomers

| PHM | Components |
| --- | --- |
| 150 | H₂O |
| 0.6 | 2,2'-azobis(2,4-dimethylvaleronitrile) |
| 0.2 | hydroxylethylcellulose (suspending agent) |
| 21.5 | Acrylonitrile |
| 10 | Methyl Methacrylate |
| 68.5 | Indene |

150 parts by weight of distilled water, 0.2 parts of HEC (which had been dissolved in water), 0.2 parts of 2,2'-azobis(2,4-dimethylvaleronitrile), 21.5 of Acrylonitrile, 5 parts of methyl methacrylate and 68.5 parts of indene were charged into reactor provided with a stirrer. The reactor was purged with nitrogen, and was kept under nitrogen pressure, The temperature of the reactor was held for 5 minutes at 72° C. with stirring; then a monomer mixture comprising 0.4 parts of 2,2'-azobis(2,4-dimethylvaleronitrile) and 5 parts of methyl methacrylate was added continually into the reactor over a period of 7.0 hours through a syringe pump. The resulting mixture was further allowed to react for 2 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 22.2 percent yield. The composition of the polymer in wt. percent was 25 acrylonitrile, 10 methyl methacrylate and 65 indene as determined by $C^{13}$ NMR.

25 parts by weight of the terpolymer was mixed with 75 parts of extrusion grade PVC and 3 parts Thermolite 813 as thermostabilizer. The mixture was kneaded for 5 minutes with a mixing brabender having a surface temperature of 190° C. The resulting blend was press formed at 190° C. into a sheet, then a plaque. The resin plaque thus prepared was tested for HDT which was 75.0° C.

EXAMPLE 3

A terpolymer was made by suspension polymerization according to the following recipe. Amounts are in weight parts per 100 parts of total monomers

| PHM | Components |
| --- | --- |
| 150 | H₂O |
| 0.6 | 2,2'-azobis(2,4-dimethylvaleronitrile) |
| 0.2 | hydroxylethylcellulose (suspending agent) |
| 30 | Acrylonitrile |
| 20 | Methyl Methacrylate |
| 50 | Indene |

150 parts by weight of distilled water, 0.2 parts of HEC (which had been dissolved in water), 0.2 parts of 2,2'-azobis(2,4-dimethylvaleronitrile), 30 parts of Acrylonitrile, 10 parts of methyl methacrylate and 50 parts of indene were charged into reactor provided with a stirrer. The reactor was purged with nitrogen, and was kept under nitrogen pressure, The temperature of the reactor was held for 5 minutes at 76° C. with stirring; then a monomer mixture comprising 0.4 parts of 2,2'-azobis(2,4-dimethylvaleronitrile) and 10 parts of methyl methacrylate was added continually into the reactor over a period of 7.0 hours through a syringe pump. The resulting mixture was further allowed to react for 2.0 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 27.8 percent yield. The composition of the polymer in wt. percent was 30 acrylonitrile, 24 methyl methacrylate and 46 indene as determined by $C^{13}$ NMR and nitrogen analysis.

25 parts by weight of the terpolymer was mixed with 75 parts of extrusion grade PVC and 3 parts Thermolite 813 as thermostabilizer. The mixture was kneaded for 5 minutes with a mixing brabender having a surface temperature of 190° C. The resulting blend was press formed at 190° C. into a sheet, then a plaque. The resin plaque thus prepared was tested for HDT which was 76.5° C.

EXAMPLE 4

A terpolymer was made by suspension polymerization according to the following recipe. Amounts are in weight parts per 100 parts of total monomers

| PHM | Components |
| --- | --- |
| 150 | H₂O |
| 0.6 | 2,2'-azobis(2,4-dimethylvaleronitrile) |
| 0.2 | hydroxylethylcellulose (suspending agent) |
| 25 | Acrylonitrile |
| 20 | Methyl Methacrylate |
| 50 | Indene |

150 parts by weight of distilled water, 0.2 parts of HEC (which had been dissolved in water), 0.2 parts of 2,2'-azobis(2,4-dimethylvaleronitrile), 25 parts of Acrylonitrile, 10 parts of methyl methacrylate and 55 parts of indene were charged into reactor provided wih a stirrer. The reactor was purged with nitrogen, and was kept under nitrogen pressure, The temperature of the reactor was held for 5 minutes at 65° C. with stirring; then a monomer mixture comprising 0.4 parts of 2,2'-azobis(2,4-dimethylvaleronitrile) and 10 parts of methyl methacrylate was added continually into the reactor over a period of 7.0 hours through a syringe pump. The resulting mixture was further allowed to react for 2.0 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 25.7 percent yield. The composition of the polymer in wt. percent was 27.7 acrylonitrile, 23.0 methyl methacrylate and 49.3 indene as determined by $C^{13}$ NMR and nitrogen analysis.

25 parts by weight of the terpolymer was mixed with 75 parts of extrusion grade PVC and 3 parts Thermolite 813 as thermostabilizer and 1 part of oxidized ethylene homopolymer as lubricant by a blender. The mixture was kneaded for 5 minutes with a mixing brabender having a surface temperature of 190° C. The resulting blend was press formed at 190° C. into a sheet, then a plaque. The resin plaque thus prepared was tested for HDT which was 77° C.

EXAMPLE 5

A terpolymer was made by suspension polymerization according to the following recipe. Amounts are in weight parts per 100 parts of total monomers

| PHM | Components |
| --- | --- |
| 150 | $H_2O$ |
| 0.6 | 2,2'-azobis(2,4-dimethylvaleronitrile) |
| 0.2 | hydroxylethylcellulose (suspending agent) |
| 30 | Acrylonitrile |
| 20 | Methyl Methacrylate |
| 50 | Indene |

150 parts by weight of distilled water, 0.2 parts of HEC (which had been dissolved in water), 0.2 parts of 2,2'-azobis(2,4-dimethylvaleronitrile), 30 parts of acrylonitrile, 10 parts of methyl methacrylate and 50 parts of indene were charged into reactor provided with a stirrer. The reactor was purged with nitrogen, and was kept under nitrogen pressure, The temperature of the reactor was held for 5 minutes at 65° C. with stirring; then a monomer comprising 0.4 parts of 2,2'-azobis(2,4-dimethylvaleronitrile), 5 parts of methyl methacrylate was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. The composition of the terpolymer was 30 acrylonitrile, 25 methyl methacrylate and 45 indene as determined by $C^{13}$ NMR and nitrogen analysis.

25 parts by weight of the terpolymer was mixed with 75 parts of extrusion grade PVC and 3 parts of the diisooctyl ester of di-n-butyltin dimercaptoacetic acid as thermostabilizer and 1 part of oxidized ethylene homopolymer as lubricant by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties.

The HDT was 78.5, the tensile strength was 9.800 psi, the flexural strength was 14,300 psi and the flexural modulus 500,000 psi.

EXAMPLE 6

A terpolymer was made by suspension polymerization according to the following recipe. Amounts are in weight parts per 100 parts of total monomers

| PHM | Components |
| --- | --- |
| 200 | $H_2O$ |
| 0.6 | 2,2'-azobis(2,4-dimethylvaleronitrile) |
| 0.2 | hydroxylethylcellulose (suspending agent) |
| 20 | Acrylonitrile |
| 30 | Methyl Methacrylate |
| 50 | Indene |

200 parts by weight of distilled water, 0.2 parts of HEC (which had been dissolved in part of the water), 0.2 parts of 2,2'-azobis(2,4-dimethylvaleronitrile), 20 parts of Acrylonitrile, 5 parts of methyl methacrylate, and 50 parts of indene were charged into reactor provided with a stirrer. The reactor was purged with nitrogen, and was kept under nitrogen pressure, The temperature of the reactor was held for 5 minutes at 65° C. with stirring; then a monomer mixture comprising 0.4 parts of 2,2'-azobis(2,4-dimethylvaleronitrile) and 25 parts of methyl methacrylate was added continually into the reactor over a period of about 13 hours through a syringe pump. The resulting mixture was further allowed to react for 3 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 34% yield. The composition of the polymer in wt. percent was 23.8 acrylonitrile, 33.2 methyl methacrylate and 43 indene as determined by $C^{13}$ NMR and nitrogen analysis.

25 parts by weight of the terpolymer was mixed with 75 parts of injection grade PVC and 3 parts Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties.

The HDT was 80° C., the flexural strength was 8,300 psi and the flexural modulus 460,000 psi.

EXAMPLE 7

A terpolymer was made by suspension polymerization according to the following recipe. Amounts are in weight parts per 100 parts of total monomers

| PHM | Components |
| --- | --- |
| 200 | $H_2O$ |
| 0.6 | 2,2'-azobis(2,4-dimethylvaleronitrile) |
| 0.2 | hydroxylethylcellulose (suspending agent) |
| 20 | Acrylonitrile |
| 20 | Methyl Methacrylate |
| 60 | Indene |

200 parts by weight of distilled water, 0.2 parts of HEC (which had been dissolved in part of the water), 0.2 parts of 2,2'-azobis(2,4-dimethylvaleronitrile), 20 parts of Acrylonitrile, 2 parts of methyl methacrylate, and 60 parts of indene were charged into reactor provided with a stirrer. The reactor was purged with nitrogen, and was kept under nitrogen pressure, The temperature of the reactor was held for 5 minutes at 68° C. with stirring; then a monomer mixture comprising 0.4 parts of 2,2'-azobis(2,4-dimethylvaleronitrile) and 18 parts of methyl methacrylate was added continually into the reactor over a period of about 10 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 34.0% yield. The composition of the polymer was 26.6 acrylonitrile, 19.6 methyl methacrylate and 53.8 indene as determined by $C^{13}$ NMR and nitrogen analysis.

25 parts by weight of the terpolymer was mixed with 75 parts of injection grade PVC and 3 parts Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties.

The HDT was 79° C., the flexural strength was 9,100 psi and the flexural modulus 490,000 psi.

EXAMPLE 8

A terpolymer was made by suspension polymerization according to the following recipe. Amounts are in weight parts per 100 parts of total monomers

| PHM | Components |
| --- | --- |
| 200 | $H_2O$ |
| 0.6 | 2,2'-azobis(2,4-dimethylvaleronitrile) |
| 0.2 | hydroxylethylcellulose (suspending agent) |
| 32 | Acrylonitrile |
| 44 | α-methylstyrene |
| 24 | Indene |

200 parts by weight of distilled water, 0.2 parts of HEC (which had been dissolved in water), 0.2 parts of 2,2'-azobis(2,4-dimethylvaleronitrile), 32 parts of Acrylonitrile, 22 parts of α-methylstyrene and 22 parts of indene were charged into reactor provided with a stirrer. The reactor was purged with nitrogen, and was kept under nitrogen pressure, The temperature of the reactor was held for 5 minutes at 65° C. with stirring; then a monomer mixture comprising 0.4 parts of 2,2'-azobis(2,4-dimethylvaleronitrile) and 22 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 40% yield. The composition of the polymer in wt. percent was 32 acrylonitrile, 53 α-methylstyrene and 15 indene as determined by N analysis and $C^{13}$ NMR. The inherent viscosity was 0.186.

25 parts by weight of the terpolymer was mixed with 75 parts of injection grade PVC and 3 parts Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties.

The HDT was 79° C., the tensile strength was 10,000 psi, the flexural strength was 9,300 psi and the flexural modulus 460,000 psi.

EXAMPLE 9

A terpolymer was made by emulsion polymerization according to the following recipe. Amounts are in weight parts per 100 parts of total monomers.

| PHM | Components |
| --- | --- |
| 300 | $H_2O$ |
| 5.0 | Siponate DS-10 |
| 0.4 | $Na_2S_2O_8$ |
| 32 | Acrylonitrile |
| 44 | α-Methylstyrene |
| 24 | Indene |

300 parts by weight of distilled water, 5.0 Siponate DS-10, 32 parts acrylonitrile, 22 parts of α-methylstyrene, 24 parts of indene and 0.4 parts of $Na_2S_2O_8$ were charged into a reactor provided with a stirrer. The reactor was purged with nitrogen, and was kept under nitrogen pressure. The temperature of the reactor was held at 65° C. for 1 hour with stirring; then a monomer comprising 22 parts of α-methylstyrene was continuously added into the reactor over a period of 12 hours through a syringe pump. The resulting mixture was allowed to react for 4.0 hours more after the additions. After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. A powdery terpolymer was obtained in a 22 percent yield. Its composition, as determined by N analysis and $C^{13}$NMR in wt. percent was 33 acrylonitrile, 44 α-methylstyrene and 23 indene, all in weight percent.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 77.5° C., the tensile strength was 9,800 psi, the flexural strength was 10,800 psi and the flexural modulus 48,000 psi.

EXAMPLE 10

A terpolymer was made by suspension polymerization according to the following recipe. Amounts are in weight parts per 100 parts of total monomers.

| PHM | Components |
| --- | --- |
| 200 | $H_2O$ |
| 0.6 | 2,2'-azobis(2,4-dimethylvaleronitrile) |
| 0.2 | hydroxylethylcellulose (suspending agent) |
| 32 | Acrylonitrile |
| 34 | α-Methylstyrene |
| 34 | Indene |

200 parts by weight of distilled water, 0.2 parts of HEC (which has been dissolved in water), 0.2 parts of 2,2'-azobis(2,4-dimethylvaleronitrile), 32 parts acrylonitrile, 10 parts of α-methylstyrene and 34 parts of indene were charged into a reactor provided with a stirrer. The reactor was purged with nitrogen, and was kept under nitrogen pressure. The temperature of the reactor was held for 5 minutes at 65° C. with stirring; then a monomer comprising 0.4 parts of 2,2'-azobis(2,4-dimethylvaleronitrile) and 24 parts of α-methylstyrene was added continually into the reactor over a period of 12 hours through a syringe pump. The resulting mixture was allowed to react for 4 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 50.0% yield. Its composition in wt. percent was 32 acrylonitrile, 46 α-methylstyrene and 22 indene as determined by N analysis and $C^{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 75.5° C., the tensile strength was 9,500 psi, the flexural strength was 8,100 psi and the flexural modulus 460,000 psi.

EXAMPLE 11

A terpolymer was made by emulsion polymerization according to the following recipe. Amounts are in weight parts per 100 parts of total monomers.

| PHM | Components |
| --- | --- |
| 300 | $H_2O$ |
| 5.0 | Siponate DS-10 |
| 0.4 | $Na_2S_2O_8$ |
| 32 | Acrylonitrile |
| 34 | α-Methylstyrene |
| 34 | Indene |

300 parts by weight of distilled water, 5.0 Siponate DS-10, 32 parts acrylonitrile, 10 parts of α-methylstyrene, 34 parts of indene and 0.4 parts of $Na_2S_2O_8$ were charged into a reactor provided with a stirrer. The reactor was purged with nitrogen, and was kept under nitrogen pressure. The temperature of the reactor was held at 65° C. for 1 hour with stirring; then a monomer comprising 24 parts of α-methylstyrene was continuously added into the reactor over a period of 12 hours through a syringe pump. The resulting mixture was allowed to react for 4.0 hours more after the additions. After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. A powdery terpolymer was obtained in a 23.0 percent yield. Its composition in wt. percent, as determined by N analysis and $C^{13}$NMR, was 33.6 acrylonitrile, 38.4 α-methylstyrene and 28.0 indene, all in weight percent.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 74.5° C., the tensile strength was 9,200 psi, the flexural strength was 107,800 psi and the flexural modulus 470,000 psi.

EXAMPLE 12

A terpolymer was made by suspension polymerization according to the following recipe. Amounts are in weight parts per 100 parts of total monomers.

| PHM | Components |
| --- | --- |
| 200 | $H_2O$ |
| 0.6 | 2,2'-azobis(2,4-dimethylvaleronitrile) |
| 0.2 | hydroxylethylcellulose (suspending agent) |
| 32 | Acrylonitrile |
| 24 | α-Methylstyrene |
| 44 | Indene |

200 parts by weight of distilled water, 0.2 parts of HEC (which has been dissolved in water), 0.2 parts of 2,2'-azobis(2,4-dimethylvaleronitrile), 32 parts acrylonitrile and 44 parts of indene were charged into a reactor provided with a stirrer. The reactor was purged with nitrogen, and was kept under nitrogen pressure. The temperature of the reactor was held for 5 minutes at 65° C. with stirring; then a monomer comprising 0.4 parts of 2,2'-azobis(2,4-dimethyl-valeronitrile) and 24 parts of α-methylstyrene was added continually into the reactor over a period of 12 hours through a syringe pump. The resulting mixture was allowed to react for 4 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 46.0% yield. Its composition in wt. percent of the polymer was 32 acrylonitrile, 14 α-methylstyrene and 54 indene as determined by N analysis and $C^{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 75.0° C., the tensile strength was 9,900 psi, the flexural strength was 10,600 psi and the flexural modulus 480,000 psi.

EXAMPLE 13

A terpolymer was made by suspension polymerization according to the following recipe. Amounts are in weight parts per 100 parts of total monomers.

| PHM | Components |
| --- | --- |
| 200 | $H_2O$ |
| 0.6 | 2,2'-azobis(2,4-dimethylvaleronitrile) |
| 0.2 | hydroxylethylcellulose (suspending agent) |
| 32 | Acrylonitrile |
| 14 | α-Methylstyrene |
| 54 | Indene |

200 parts by weight of distilled water, 0.2 parts of HEC (which has been dissolved in water), 0.2 parts of 2,2'-azobis(2,4-dimethylvaleronitrile), 32 parts acrylonitrile and 54 parts of indene were charged into a reactor provided with a stirrer. The reactor was purged with nitrogen, and was kept under nitrogen pressure. The temperature of the reactor was held for 5 minutes at 65° C. with stirring; then a monomer comprising 0.4 parts of 2,2'-azobis(2,4-dimethyl-valeronitrile) and 14 parts of α-methylstyrene was added continually into the reactor over a period of 12 hours through a syringe pump. The resulting mixture was allowed to react for 4 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 50% yield. Its composition in wt. percent was 32 acrylonitrile, 22.0 α-methylstyrene and 46 indene as determined by N analysis and $C^{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 77.0° C., the tensile strength was 9,900 psi, the flexural strength was 10,600 psi and the flexural modulus 480,000 psi.

EXAMPLE 14

A terpolymer was made by emulsion polymerization according to the following recipe. Amounts are in weight parts per 100 parts of total monomers.

| PHM | Components |
| --- | --- |
| 300 | $H_2O$ |
| 4.0 | Siponate DS-10 |
| 0.4 | $Na_2S_2O_8$ |
| 32 | Acrylonitrile |
| 14 | α-Methylstyrene |
| 54 | Indene |

300 parts by weight of distilled water, 4.0 Siponate DS-10, 32 parts acrylonitrile, 10 parts of α-methylstyrene, 54 parts of indene and 0.2 parts of $Na_2S_2O_8$ were charged into a reactor provided with a stirrer. The reactor was purged with nitrogen, and was kept under nitrogen pressure. The temperature of the reactor was held at 65° C. for 1 hour with stirring; then a monomer comprising 4 parts of α-methylstyrene was continuously added into the reactor over a period of 12 hours through a syringe pump. At the third hour an additional 0.2 parts of $Na_2S_2O_8$ was added into the reactor. The resulting mixture was allowed to react for 4.0 hours more after the continuous additions. After completion of the reaction, the polymer was recovered through freeze coagulation of the latex. The polymer was filtered and was then stirred with excess methanol overnight to remove residual monomers. The polymer was filtered again and dried in a vacuum over for 24 hours at 60° C. A powdery terpolymer was obtained in a 46 percent yield. Its composition in wt. percent, as determined by N analysis and $C^{13}$NMR was 33 acrylonitrile, 4 α-methylstyrene and 63 indene, all in weight percent.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties, as noted below:

The HDT of the blend was 74.5° C., the flexural strength was 11,400 psi and the flexural modulus 490,000 psi.

EXAMPLE 15

A terpolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | hydroxylethylcellulose (suspending agent) |
| 32 | Acrylonitrile |
| 44 | α-Methylstyrene |
| 24 | Indene |

150 parts by weight of distilled water, 0.2 parts of HEC (which has been dissolved in water), 0.2 parts of 2,2'-azobis(2,4-dimethylvaleronitrile), 32 parts acrylonitrile, 20 parts of α-methylstyrene and 24 parts of indene were charged into a reactor provided with a stirrer. The reactor was purged with nitrogen, and was kept under nitrogen pressure. The temperature of the reactor was held for 5 minutes at 65° C. with stirring; then a monomer comprising 0.4 parts of 2,2'-azobis(2,4-dimethylvaleronitrile) and 24 parts of α-methylstyrene was added continually into the reactor over a period of 12 hours through a syringe pump. The resulting mixture was allowed to react for 4 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 49% yield. Its composition in wt. percent was 31 acrylonitrile, 58 α-methylstyrene and 11 indene as determined by N analysis and $C^{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 76.5° C., the melt index as 2.922/10 min., the tensile strength was 10,200 psi, the flexural strength was 10,600 psi and the flexural modulus 460,000 psi.

EXAMPLE 16

A terpolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | hydroxylethylcellulose (suspending agent) |
| 32 | Acrylonitrile |
| 34 | α-Methylstyrene |

| PHM | Components |
|---|---|
| 34 | Indene |

150 parts by weight of distilled water, 0.2 parts of HEC (which has been dissolved in water), 0.2 parts of 2,2'-azobis(2,4-dimethylvaleronitrile), 32 parts acrylonitrile, 20 parts of α-methylstyrene and 34 parts of indene were charged into a reactor provided with a stirrer. The reactor was purged with nitrogen, and was kept under nitrogen pressure. The temperature of the reactor was held for 5 minutes at 65° C. with stirring; then a monomer comprising 0.4 parts of 2,2'-azobis(2,4-dimethylvaleronitrile) and 14 parts of α-methylstyrene was added continually into the reactor over a period of 12 hours through a syringe pump. The resulting mixture was allowed to react for 4 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 50% yield. Its composition in wt. percent was 31.0 acrylonitrile, 49 α-methylstyrene and 20 indene as determined by N analysis and $C^{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 75.5° C., the melt index as 4.842/10 min., the tensile strength was 9,200 psi, the flexural strength was 10,600 psi and the flexural modulus 440,000 psi.

EXAMPLE 17

A terpolymer was made by suspension polymerization according to the following recipe. Amounts are in weight parts per 100 parts of total monomers.

| PHM | Components |
|---|---|
| 150 | H₂O |
| 0.6 | 2,2'-azobis(2,4-dimethylvaleronitrile) |
| 0.2 | hydroxylethylcellulose (suspending agent) |
| 32 | Acrylonitrile |
| 34 | Indene |
| 34 | Styrene |

150 parts by weight of distilled water, 0.2 parts of HEC (which has been dissolved in water), 0.2 parts of 2,2'-azobis(2,4-dimethylvaleronitrile), 32 parts acrylonitrile, and 34 parts of indene were charged into a reactor provided with a stirrer. The reactor was purged with nitrogen, and was kept under nitrogen pressure. The temperature of the reactor was held for 5 minutes at 65° C. with stirring; then a monomer comprising 0.4 parts of 2,2'-azobis(2,4-dimethyl-valeronitrile) and 34 parts of styrene was added continually into the reactor over a period of 12 hours through a syringe pump. The resulting mixture was allowed to react for 4 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 54.5% yield. Its composition in wt. percent was 33 acrylonitrile, 28 styrene and 39 indene as determined by N analysis and $C_{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 75.0° C., the melt index as 2.279/10 min., the tensile strength was 6,350 psi, the flexural strength was 10,600 psi and the flexural modulus 460,000 psi.

EXAMPLE 18

A terpolymer was made by suspension polymerization according to the following recipe. Amounts are in weight parts per 100 parts of total monomers.

| PHM | Components |
|---|---|
| 150 | H₂O |
| 0.6 | 2,2'-azobis(2,4-dimethylvaleronitrile) |
| 0.2 | hydroxylethylcellulose (suspending agent) |
| 30 | Acrylonitrile |
| 60 | Indene |
| 10 | Styrene |

150 parts by weight of distilled water, 0.2 parts of HEC (which has been dissolved in water), 0.2 parts of 2,2'-azobis(2,4-dimethylvaleronitrile), 30 parts acrylonitrile, and 58 parts of indene were charged into a reactor provided with a stirrer. The reactor was purged with nitrogen, and was kept under nitrogen pressure. The temperature of the reactor was held for 5 minutes at 65° C. with stirring; then a monomer comprising 0.4 parts of 2,2'-azobis(2,4-dimethyl-valeronitrile), 10 parts of styrene and 2 parts of indene was added continually into the reactor over a period of 12 hours through a syringe pump. The resulting mixture was allowed to react for 4 more hours. After completion of the reaction, the polymer obtained was dissolved into acetone, and reprecipitated in excess methanol. The polymer was filtered, and dried in a vacuum oven for 24 hours at 60° C. A powdery terpolymer was obtained in a 51.5% yield. Its composition in wt. percent was 31 acrylonitrile, 15 styrene and 54 indene as determined by N analysis and $C^{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 73.5° C., the melt index as 2.934/10 min., the tensile strength was 9,320 psi, the flexural strength was 9,000 psi and the flexural modulus 460,000 psi.

EXAMPLE 19

A terpolymer was made by emulsion polymerization using the following recipe. Amounts are in weight parts per 100 parts of total monomers.

| | |
|---|---|
| Water | 200 |
| Sodium Lauryl Sulfate | 2.5 |
| Sodium Phosphate 12H$_2$O | 1.0 |
| Methyl Methacrylate | 80 |
| Indene | 15 |
| Acrylonitrile | 5 |
| Sodium Persulfate | 0.5 |

The reactor was charged with the ingredients listed above, purged with nitrogen and sealed. The reactor was then mechanically agitated and heated to 60° C. and held at 60° C. for 16 hours. The polymer was recovered by freeze coagulation followed by washing with methanol and drying. The yield of polymer was 90%. The composition of polymer was 3% acrylonitrile, 14% indene and 83% methyl methacrylate as determined by C$^{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 75.5° C., the tensile strength was 9,860 psi, the flexural strength was 14,420 psi and the flexural modulus 406,000 psi, and the melt index was 0.824 gram/10 min (at 175° C.).

EXAMPLE 20

A terpolymer was made by emulsion polymerization using the following recipe. Amounts are in weight parts per 100 parts of total monomers.

| | |
|---|---|
| Water | 200 |
| Sodium Lauryl Sulfate | 2.5 |
| Sodium Phosphate 12H$_2$O | 1.0 |
| Styrene | 70 |
| Indene | 10 |
| Acrylonitrile | 20 |
| Sodium Persulfate | 0.5 |

The reactor was charged with the ingredients listed above, purged with nitrogen and sealed. The reactor was then mechanically agitated and heated to 60° C. and held at 60° C. for 16 hours. The polymer was recovered by freeze coagulation followed by washing with methanol and drying. The yield of polymer was 88%. The composition of polymer was 12% acrylonitrile, 44% indene and 44% styrene as determined by C$^{13}$ NMR.

25 parts by weight of the terpolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, tensile strength and other physical properties, as noted below:

The HDT of the blend was 77° C., the tensile strength was 9,230 psi, the flexural strength was 13,590 psi and the flexural modulus 384,000 psi, and the melt index was 1.634 gram/10 min (at 175° C.).

In the compositions used to blend with vinyl chloride polymers, when more than one "third monomer" is chosen, the polymer is not technically a "terpolymer" but the term is used herein and in the claims for convenience.

As will be evident to those skilled in the art, various modifications of this invention can be made or followed in the light of the foregoing disclosure and discussion without departing from the spirit and scope of the disclosure or from the scope of the claims.

We claim:

1. A composition comprising an intimate admixture of (a) 50 to 98 parts by weight of a vinyl chloride polymer having an inherent viscosity of at least 0.4, and (b) 50 to 2 parts by weight of an addition terpolymer containing acrylonitrile, indene and a third monomer selected from methyl methacrylate or at least one monomer of the group α-methylstyrene and vinyl aromatics of the formula:

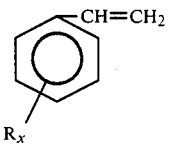

where each R is independently selected from Cl, H and a C$_1$ to C$_9$ alkyl group and x=1 or 2, combined in the polymer structure such that
   (1) when the third monomer is methyl methacrylate, the polymer contains in weight percent 2-35 acrylonitrile, 10-67 indene, 5-85 methyl methacrylate, and the moles of acrylonitrile plus methyl methacrylate are equal to or more than the moles of indene,
   (2) when the third monomer is one or both of α-methylstyrene and said vinyl aromatics, the polymer contains in weight percent 10-40 acrylonitrile, 5-67 indene and 4-70 of said third monomer, and the moles of acrylonitrile plus said vinyl aromatics is equal to or greater than the moles of α-methylstyrene plus indene.

2. A composition comprising an intimate admixture of (a) 50 to 98 parts by weight of a vinyl chloride polymer having an inherent viscosity of at least 0.4, and (b) 50 to 2 parts by weight of an addition terpolymer containing acrylonitrile, indene and a third monomer selected from methyl methacrylate or one or both of styrene and α-methylstyrene, combined in the polymer structure such that, (1) when the third monomer is methyl methacrylate, the polymer contains in weight percent 2-35 acrylonitrile, 10-67 indene, 5-85 methyl methacrylate, and the moles of acrylonitrile plus methyl methacrylate are equal to or more than the moles of indene, (2) when the third is one or both of α-methylstyrene and styrene, the polymer contains in weight percent 10-40 acrylonitrile, 5-67 indene, 4-70 of the third monomer α-methylstyrene and/or styrene, and the moles of acrylonitrile plus styrene is equal to or greater than the moles of α-methylstyrene plus indene.

3. A composition of claim 2 wherein said third monomer is methyl methacrylate.

4. A composition of claim 2 wherein said third monomer is one or both of α-methylstyrene and styrene.

5. A composition of claim 2 wherein said third monomer is α-methylstyrene.

6. A composition of claim 2 wherein said third monomer is styrene.

7. A composition of claim 1 wherein the vinyl aromatics of said formula are chosen from styrene, o-chlorostyrene, p-chlorostyrene, o-ethylstyrene, p-ethylstyrene, o-tert.-butylstyrene, p-tert.-butylstyrene, o-methylstyrene, m-ethylstyrene, p-methylstyrene, m-tert.-butylstyrene, m-ethylstyrene and o,p-dichlorostyrene.

8. A composition of claim 1 containing at least 25 weight percent indene combined in the polymer structure.

9. A composition of claim 2 containing at least 25 weight percent indene combined in the polymer structure.

10. A composition of claim 3 containing at least 25 weight percent indene combined in the polymer structure.

11. A composition of claim 1 wherein the acrylonitrile, indene and the indicated third monomer are combined in the polymer structure in the weight percentages as follows:
Acrylonitrile: 2–25
Methyl methacrylate: 5–85
Indene: 10–67.

12. A composition of claim 1 wherein the acrylonitrile, indene and the indicated third monomer are combined in the polymer structure in the weight percentages as follows:
Acrylonitrile: 31–40
α-methylstyrene: 4–64
Indene: 5–65.

13. A composition of claim 1 wherein the acrylonitrile, indene and the indicated third monomer are combined in the polymer structure in the weight percentages as follows:
Acrylonitrile: 10–40
Styrene: 4–70
Indene: 10–67.

14. A composition of claim 11 containing at least 25 weight percent indene combined in the polymer structure.

15. A composition of claim 12 containing at least 25 weight percent indene combined in the polymer structure.

16. A composition of claim 13 containing at least 25 weight percent indene combined in the polymer structure.

* * * * *